United States Patent [19]

Kaji et al.

[11] Patent Number: 5,456,216

[45] Date of Patent: Oct. 10, 1995

[54] METHOD AND APPARATUS OF COMBUSTION FOR A PIPESTILL HEATER

[75] Inventors: Hitoshi Kaji; Yuji Fukuda, both of Kanagawa, Japan

[73] Assignee: Chiyoda Corporation, Japan

[21] Appl. No.: 168,843

[22] Filed: Dec. 17, 1993

[30] Foreign Application Priority Data

Dec. 21, 1992 [JP] Japan .................... 4-340703

[51] Int. Cl.$^6$ .................................... F22B 5/00
[52] U.S. Cl. .................... 122/17; 432/181; 126/91 A; 126/360 R
[58] Field of Search .................... 432/181, 180, 432/179; 122/17; 126/91 A, 360 R

[56] References Cited

U.S. PATENT DOCUMENTS

| 2,688,589 | 9/1954 | Campbell . | |
|---|---|---|---|
| 4,126,419 | 11/1978 | Katabuchi . | |
| 4,856,492 | 8/1989 | Kawamoto | 126/91 A |
| 4,926,842 | 5/1990 | Watson et al. | 126/91 A |
| 5,275,556 | 1/1994 | Hirose | 432/181 |
| 5,297,954 | 3/1994 | Colagiovanni | 119/211 |

FOREIGN PATENT DOCUMENTS

| 0526172A2 | 2/1993 | European Pat. Off. . |
|---|---|---|
| 1113533 | 9/1961 | Germany . |
| 55-110817 | 8/1980 | Japan . |
| 57-037607 | 3/1982 | Japan . |
| 63-159622 | 10/1988 | Japan . |
| 2208432A | 3/1989 | United Kingdom . |

*Primary Examiner*—Raymond A. Nelli
*Attorney, Agent, or Firm*—Connolly & Hutz

[57] ABSTRACT

This invention has an object of providing a compact and inexpensive apparatus and method of combustion for a pipestill heater which enjoys high thermal efficiency insusceptible of the restriction imposed by either the inlet temperature of the process fluidor the magnitude of the allowable pressure drop in the coil, incurs only a sparing possibility of polluting the environment, and produces only a petty pressure fluctuation in the combustion chamber.

In the pipestill heater of this invention, the combustion devices which are disposed so as to confront the combustion chambers of the furnace are each provided with an air permeable heat accumulator made of a refractory material and a duct part having an oxidizing agent supply path and an exhaust gas discharge path formed therein, whereby the oxidizing agent for combustion is heated with the exhaust gas through the heat accumulator by virtue of the relative rotation of the heat accumulator and the duct part with rotating means.

9 Claims, 7 Drawing Sheets

RELATION BETWEEN ROTATIONAL FREQUENCY AND EXHAUST GAS TEMPERATURE

METHOD AND APPARATUS OF COMBUSTION FOR A PIPESTILL HEATER

BACKGROUND OF THE INVENTION

1. Field of the Invention

This invention relates to a method and apparatus of combustion for a pipestill heater adapted to use the heat of the exhaust gas resulting from combustion for heating the oxidizing agent for combustion.

2. Description of the Prior Art

The pipestill heater is used in various processes pertaining to petroleum refining, petrochemistry, and general chemistry for the purpose of heating with an open flame a fluid subjected to heating which is flowing through tubes of the furnace.

The conventional pipestill heater, as illustrated in FIG. 8, comprises a combustion chamber 100 formed by lining a casing of steel plates with refractory insulating material, heating tubes 101 laid out inside the combustion chamber 100, and combustion devices 102 set in place therein. It is so configured as to heat such a fluid as naphtha or gasoline flowing in the heating tubes 101 by means of the combustion devices 102.

More often than not, the pipestill heater has heretofore effected the required heating by virtue of the radiation and convection of a flame. The portion of this furnace which is heated mainly by the radiative heat transfer forms a radiation section 103 and the portion thereof which is heated mainly by the convective heat transfer a convection section 104. The fluid subjected to heating is generally supplied in a direction opposite to the stream of the combustion gas from the viewpoint of exalting the thermal efficiency. The individual heating tubes 101 are connected in series with U-shaped joints to form what is called a coil path. The fluid subjected to heating is first introduced via an inlet tube 106 into the convection section 104 to be preheated therein, then advanced into the radiation section 103 to be heated to a prescribed temperature therein, and thereafter allowed to flow out of an outlet tube 107. In FIG. 8, the reference numeral "105" stands for a stack.

The thermal efficiency of the pipestill heater of this kind is generally in the range of 60 to 85%. Even with the pipestill heater of such a large size as illustrated in FIG. 9 (wherein like component members found in FIG. 8 are denoted by like reference numerals), it is difficult to obtain such a high thermal efficiency as 90% on account of the restriction imposed by the inlet temperature of the fluid on the preheating with the convection section 104. It is, therefore, conceivable to provide the pipestill heater under discussion with such an additional component as preheater 108 for preheating an oxidizing agent consisted of the air for combustion and the like. or a waste-heat boiler and exalt the thermal efficiency of the pipestill heater to a level above 90%. The words "oxidizing agent" as used herein constitute themselves the generic term for designating such gases as pure oxygen, air and oxygen-enriched air which contain molecular oxygen. In some case a halogen, a oxidizing material or chemical compound such as a nitric oxide may be used as an oxidizing agent. In FIG. 9, the reference numeral "109" stands for a forced draft fan and the reference numeral "110" for an induced draft fan.

In the pipestill heater of this kind, the amount of heat absorbed by the convention section 104 is less than half of the amount absorbed by the radiation section 103 in spite of the fact that the tube surface area of the convection section 104 available for heat absorption is more than twice that of the radiation section 103. In respect of the return of investment, some if not all small pipestill heaters omit the convention section 104 and resort solely to the radiation section 103. These furnaces which are devoid of the convection section 104, therefore, possibly suffer from inferior thermal efficiency due to insufficient preheating.

Some of the pipestill heaters such as, a furnace for use in a catalytic reforming plant necessitate absorption of a large amount of heat as a whole and yet, by reason of process, require to set the inlet temperature of the fluid subjected to heating at a high level (in the neighborhood of 440° C.) and, what is more, the allowable pressure drop through the coil at an extremely low level (0.2 to 0.3 $Kg/cm^2$). These pipestill heaters are at a disadvantage in inevitably imposing a limit of its own on the thermal efficiency to be attained at all and failing to acquire improvement in quality because the fluid supplied to the radiation section 103 to be heated therein cannot be likewise supplied to the convection section 104 and this fluid must be heated solely by the radiation section 103.

Further, the large pipestill heater of the kind illustrated in FIG. 9 is provided with such an additional component as the oxidizing agent preheater 108 or waste-heat boiler and, therefore, requires an increase in the length $L_2$ in the direction of width of the furnace and not in the length $L_1$ in the direction of length thereof and results in having a large floor space for the installation of the furnace. Moreover, such additional component as the oxidizing agent preheater 108 involves as high cost of construction as the furnace proper and results in boosting the overall cost of the pipestill heater facilities.

SUMMARY OF THE INVENTION

This invention has issued from the efforts devoted to the solution of the problems entailed by the prior art as described above. The first object of this invention is to provide a method of combustion for pipestill heater which enjoys high thermal efficiency insusceptible of the restriction imposed by either the inlet temperature of the process fluid or the magnitude of the allowable pressure drop through the coil, incurs only a small possibility of polluting the environment, and produces only a petty fluctuation of the pressure in the combustion chamber.

The second object of this invention is to provide a compact and inexpensive apparatus of combustion for a pipestill heater which enjoys high thermal efficiency insusceptible of the restriction imposed by either the inlet temperature of the process fluid or the magnitude of the allowable pressure drop through the coil, incurs only a small possibility of polluting the environment, and produces only a petty pressure fluctuation in the combustion chamber.

To accomplish the first object described above, this invention is directed to a method of combustion for a pipestill heater composed of a combustion chamber, heating tubes adapted to allow flow therein of the process fluid and laid out inside said combustion chamber, and combustion devices disposed so as to spout flames into said combustion chamber and consequently enabled to apply heat to the fluid flowing in said heating tube through said heating tubes, which method is characterized by allowing an oxidizing agent discharged through said oxidizing agent supply path forwarding said oxidizing agent through the interior thereof to pass through part of heat accumulators fixed in a wall of said combustion chamber and, at the same time, causing the area of said regenerating part for passage of said oxidizing agent to be changed along the course of time.

To accomplish the second object described above, this invention is directed to an apparatus of combustion for a pipestill heater composed of a combustion chamber, heating tubes adapted to allow flow therein of the process fluid and laid out inside said combustion chamber, and combustion devices disposed so as to spout flames into said combustion chamber and consequently enabled to apply heat to the fluid flowing in said heating tube through said heatingtubes, which apparatus is characterized in that said combustion devices are each composed of a burner for heating said heating tubes, an oxidizing agent supply path for supplying an oxidizing agent to said burner, an exhaust gas discharge path for discharging the exhaust gas resulting from the combustion to the exterior of said combustion chamber and an air-pervious heat accumulator, attaching said heat accumulator to a wall of said combustion chamber, and causing said oxidizing agent discharged through said oxidizing agent supply path to pass through part of the heat accumulator and, at the same time, causing the area of said heat accumulator for passing said oxidizing agent to be changed along the course of time.

The configuration just described gives birth to an apparatus of combustion for pipestill heater which lacks a convection section and possesses only a radiation section. The combustion heat of flames spouted from the burners is entirely absorbed through the radiation section and the heat accumulator.

Thus, the total length of the heating tubes can be decreased and the allowable pressure drop through the coil likewise decreased. Further, it is enabled to effect necessary heating without being affected by either the inlet temperature of the process fluid or the magnitude of the allowable pressure drop in the coil by process requirements.

When the exhaust gas is discharged out of the combustion chamber, it is passed in the process of this discharge through the thermal accumulators and the duct part which are kept in relative rotation. Thus the greater part of the heat of the exhaust gas is utilized for heating the oxidizing agent for combustion and the exhaust gas is at a low temperature at the time that it is discharged out of the system. The combustion device is the outcome of combination of an oxidizing agent preheater with a burner. Owing to this construction, the pipestill heater contributes immensely to the improvement of the thermal efficiency even from the structural point of view without heat loss caused by the duct part.

Further, the exhaust gas is discharged through the duct parts which are being relatively rotated to the heat accumulators, the greater part of the heat of the exhaust gas is utilized for heating the oxidizing agent for combustion owing to the heat-exchanging action of the accumulators and the temperature of the exhaust gas is fixed without reference to the elapse of time. Thus, the exhaust gas is finally discharged at a low temperature into the atmosphere. Since the combustion proceeds continuously, the possible fluctuation of the pressure in the combustion chamber due to the combustion is negligibly small. When the exhaust gas is discharged out of the furnace, it is aspirated by the heat accumulator from around the flames and, mingles with the flames. As a result, it brings about the so-called internal recycling effect of the exhaust gas, and the exhaust gas has a conspicuously lowered $NO_x$ content enough to permit ample repression of the otherwise possible environmental pollution.

DETAILED DESCRIPTION OF THE PREFERRED EMBODIMENT

Now, one embodiment of the present invention will be described below with reference to the accompanying drawings.

Figure 1:
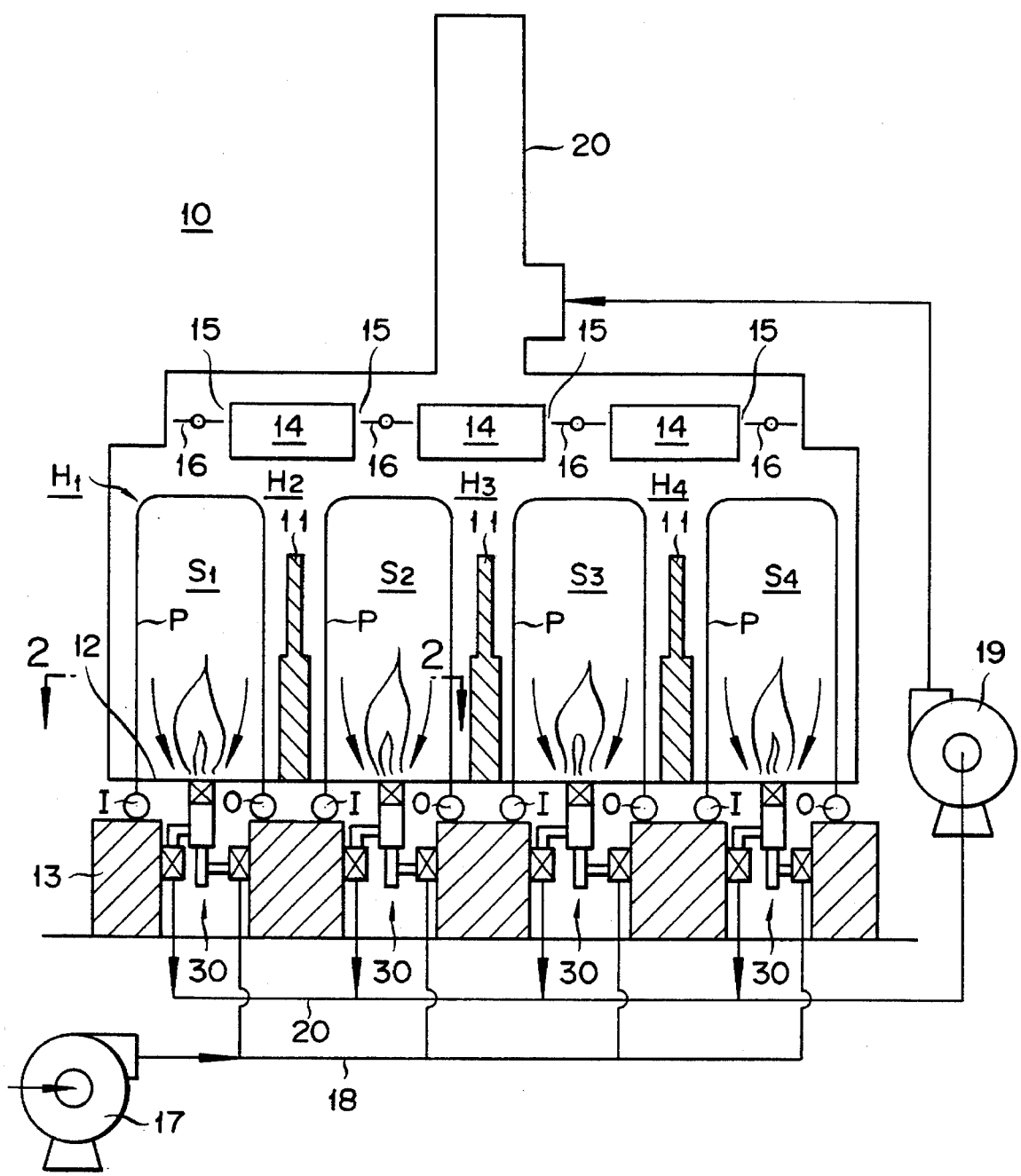
FIG. 1 is a schematic cross section of a pipestill heater as one embodiment of this invention.

In FIG. 1, a pipestill heater 10 is a box-type furnace to be used in a catalytic reforming plant. In the pipestill heater 10, four combustion chambers $H_1$ to $H_4$ (the reference symbol H to be used hereinafter for generally referring to $H_1$ to $H_4$) are formed as divided with partition walls 11 having a prescribed height. The size $L_1$ (FIG. 2) of each of the combustion chambers $H_1$ to $H_4$ in the direction of length thereof perpendicular to the surface of the paper containing the drawing is ten and odd meters. In these combustion chambers $H_1$ to $H_4$, a plurality of inverted U-shaped heating tubes P laid out at a prescribed interval in the direction of length. The plurality of heating tubes P make up a radiation section. The terminal parts of these heating tubes P are elongated through a furnace floor part 12 of the wall part of the combustion chamber and then connected severally to input pipes I and output pipes O which function as headers disposed below the furnace floor part 12 and extended in the direction of length. The inlet pipes I play the role of supplying a process fluid to the heating tubes P and serve the purpose of supplying the process fluid via a heat exchanger which are omitted from illustration. They are connected to the output pipes O of the adjacent combustion chambers H through pipes and reactors which are omitted from illustration. The inlet pipes I and the outlet pipes O are supported on a base 13.

Directly above the combustion chambers H, paths 15 are opened in ceiling walls 14. An exhaust gas damper 16 are disposed rotatably in the paths 15.

Combustion devices 30 which are provided for the combustion chambers H mentioned above, as specifically described afterward, are intended to spout flames toward empty spaces S (the reference symbol S to be used hereinafter in referring generally to the empty spaces $S_1$ to $S_4$) defined by the multiplicity of inverted U-shaped heating tubes P and utilize the heat of radiation of the flames for heating the fluid being supplied in the heating tubes P through these heating tubes P. In the diagram, the combustion chambers H are depicted as being severally provided with only one combustion device 30. To each of the combustion devices 30, the oxidizing agent, or air in this embodiment for combustion is supplied by the use of a forced draft fan 17 and an oxidizing agent supply duct 18. The exhaust gas emanating from each of the combustion devices 30 is discharged by the use of an induced draft fan 19 and a discharge tube 20.

Figure 3:
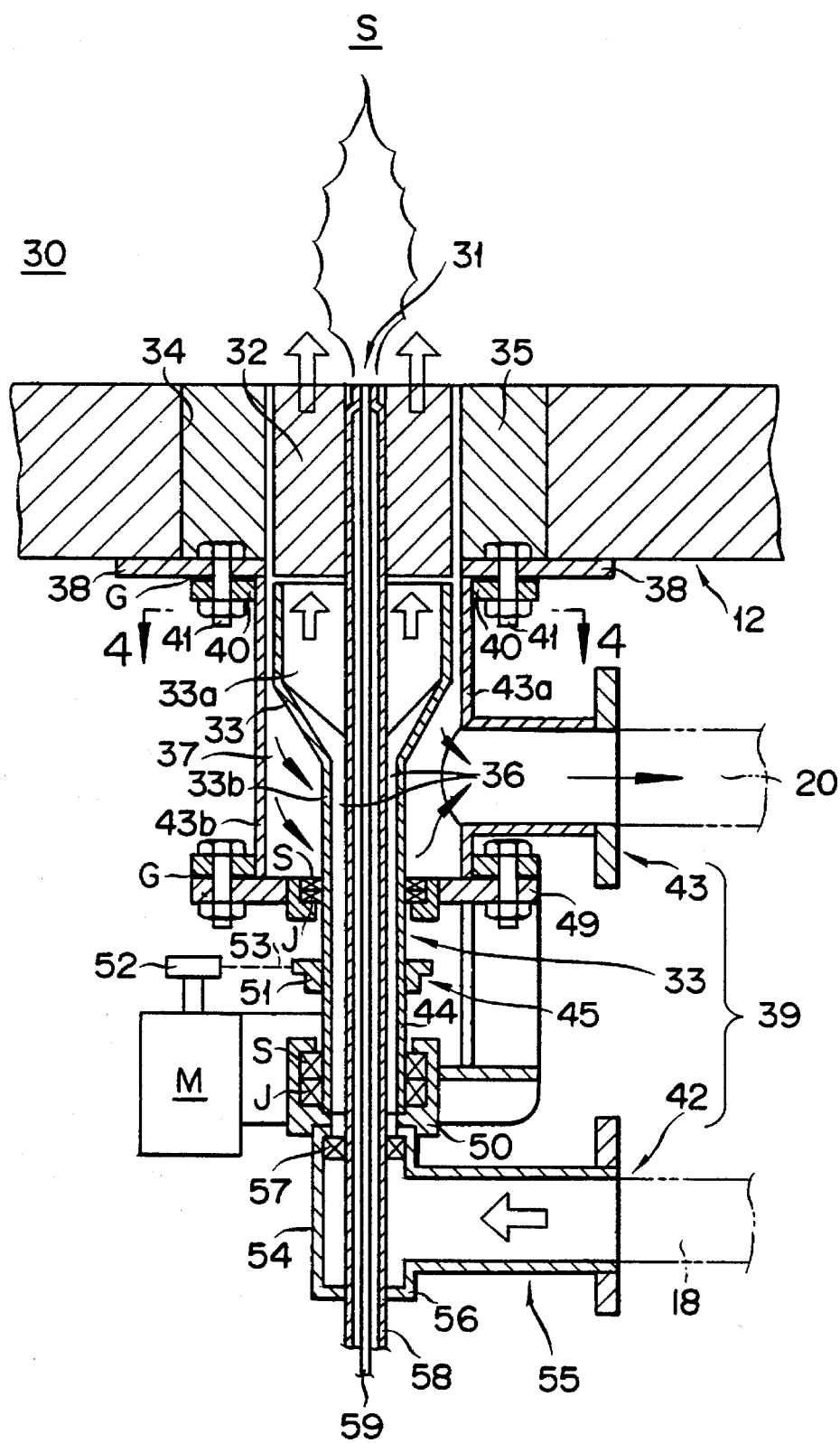
FIG. 3 is a cross section of a combustion device.

The combustion device 30, which may well be called a rotary regenerative burner as illustrated in FIG. 3, is composed of a burner 31 adapted to spout a flame upwardly, a thermal accumulator 32 attached to the furnace floor part 12 or the wall member of the combustion chamber H, and adapted to function as a heat-exchanging member, and a duct part 33.

First, the thermal accumulator 32 is desired to be formed of an air-permeable refractory material of a low pressure loss and a large thermal capacity such as, a ceramic material containing numerous honeycomb holes. Since the ceramic material is proof against corrosion, it never induces the thermal accumulator 32 using this material to undergo low-temperature corrosion even when the temperature of the exhaust gas falls below the dew point temperature of acid during the progress of the recovery of heat from the exhaust gas.

A heat resisting material may be suitably selected in dependence on conditions for use. Ceramic material such as oxide, nitride and carbide, heat and acid resisting metallic material such as stainless steel and hastelloy, and a composite material composed of ceramic material and metallic material or ceramic material and high-melting material may be used. Aluminum oxide, silica, silicon carbide, silicon nitride and SIALON may be used as a ceramic material. In this invention cordierite and mullite are desirable in particular by reason of advantages such as high-temperature strength, facility of processing and heat capacity.

The thermal accumulator 32 is set in place inside an opening part 34 which is formed in the furnace floor part 12 and is supported by setting ring 35.

On the side of the thermal accumulator 32 opposite to the combustion chamber side, the duct part 33 having formed therein an oxidizing agent supply path 36 intended to supply oxidizing agent for combustion to the burner 31 and an exhaust gas discharge path 37 intended to discharge into the atmosphere the exhaust gas resulting from the combustion in the combustion chamber H is disposed so as to communicate with the thermal accumulator 32. The said oxidizing agent supply path 36 is adapted to spout said oxidizing agent through a plurality of outlet parts in the direction of said thermal accumulator 32.

The burner 31 which is set in place at the center of the thermal accumulator 32 is an ordinary gas or oil burner whose leading end is exposed to the interior of the combustion chamber H. The oxidizing agent for combustion flows first through the oxidizing agent supply pipe 18 and then through the oxidizing agent supply path 36 formed inside the duct part 33, advances through the thermal accumulator 32 disposed around the burner 31, and spouts out from the periphery of the burner 31.

A plate 38 for supporting the burner 31 is formed along the outer edge of the opening part 34. A flange 40 for a body case 39 is connected to the plate 38 with bolts 41 through a gasket G so as to establish communication between the body case 39 and the thermal accumulator 32.

The body case 39 is provided with an oxidizing agent inlet part 42 for introducing the oxidizing agent for combustion supplied through the oxidizing agent supply pipe 18, an outlet part 43 for discharging the exhaust gas into the outlet pipe 20, the duct part 33 formed between the oxidizing agent inlet 42 and the thermal accumulator 32, and a drive part 45 for rotating the duct part 33.

Figure 4:
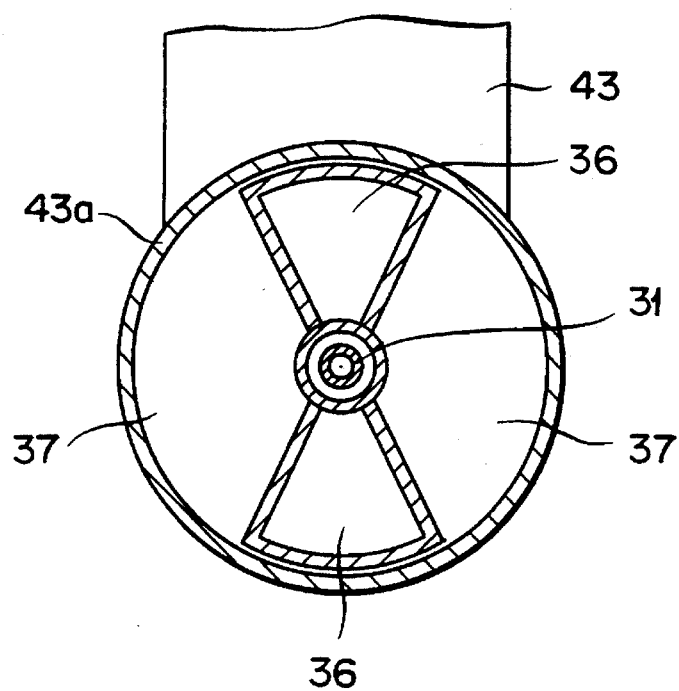
FIG. 4 is a cross section taken through FIG. 3 along the line 4—4.

In a barrel part 43a of the outlet part 43 mentioned above, a large-diameter part 33a of the duct part 33 is formed. The large-diameter part 33a constitutes itself part of the oxidizing agent supply path 36 and has a cross section of an acute sector as illustrated in FIG. 4. The internal space of the barrel part 43a is divided with one and over oxidizing agent supply paths 36. Around the burner 31 established communication with the body case 39, the oxidizing agent supply paths 36 and the exhaust gas discharge path 37 are disposed so as to be alternately positioned in the circumferential direction. Further, the outlet part of the oxidizing agent supply paths 36 may be closed with an end plate having numerous small holes so that the oxidizing agent on being discharged convert to high speed flow.

The oxidizing agent supply paths 36 and the exhaust gas discharge paths 37 are so formed as to extend independently of each other in the thermal accumulator 32. For example, the oxidizing agent supply paths 36 are so adapted so as to enable the oxidizing agent flowing in through the oxidizing agent inlet part 42 to advance first through the duct part 36 and then through a transitional part gradually widening from a small-diameter part 33b to the large-diameter part 33a and flow outwardly in the direction of the thermal accumulator 32.

The exhaust gas discharge paths 37 are so formed in such a manner that the exhaust gas emanating from the thermal accumulator 32 will be guided, for instance, through the parts thereof having a cross section of an obtuse-angled sector into an internal empty space 43b of the barrel part 43a in the outlet part 43.

The drive part 45 supports the duct part 33 rotatably by means of seal members S and bearings J respectively disposed on the inner end part of a blocking plate 49 formed so as to block the end part on the side of the barrel part 43a in the output part 43 opposite to the thermal accumulator side and on the inner end part of a supporting plate 50 disposed on the right end part of the small-diameter part 33b in the duct part 33 and interconnects a sprocket 51 fixed between the two bearings J and J and a driving gear 52 rotated with a motor M through a chain 53. In the present embodiment, since the duct part 33 is supported as balanced by the two bearings J and J as described above, the duct part 33 can be rotated at a relatively high speed and an increase in the speed of this rotation results in an improvement of thermal efficiency. An experiment conducted to determine the relation between the rotational speed of the duct part 33 and the thermal efficiency has produced the data shown in FIG. 5.

Figure 5:
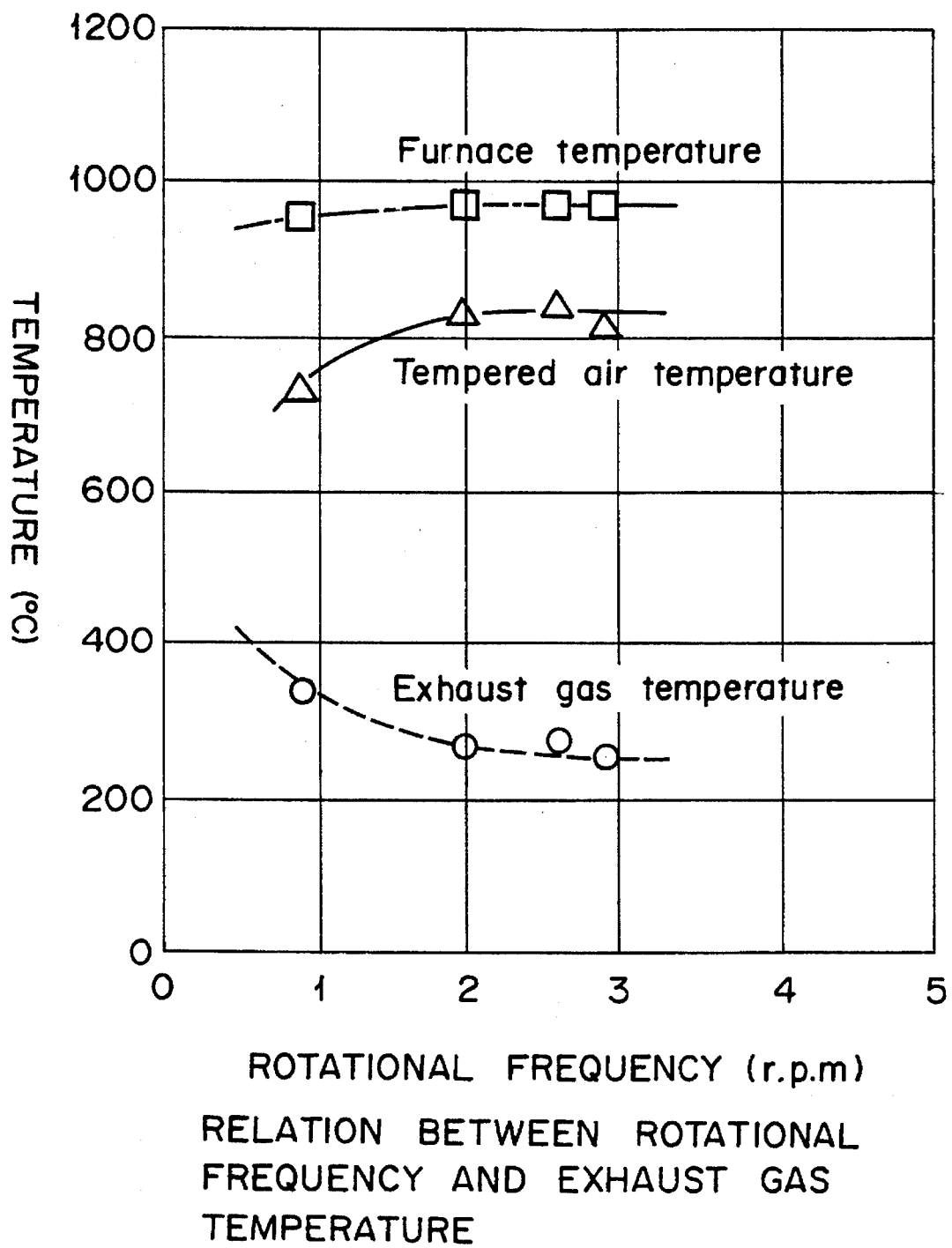
FIG. 5 is a graph showing the results of a test performed on the combustion device of the present invention.
Figure 6:
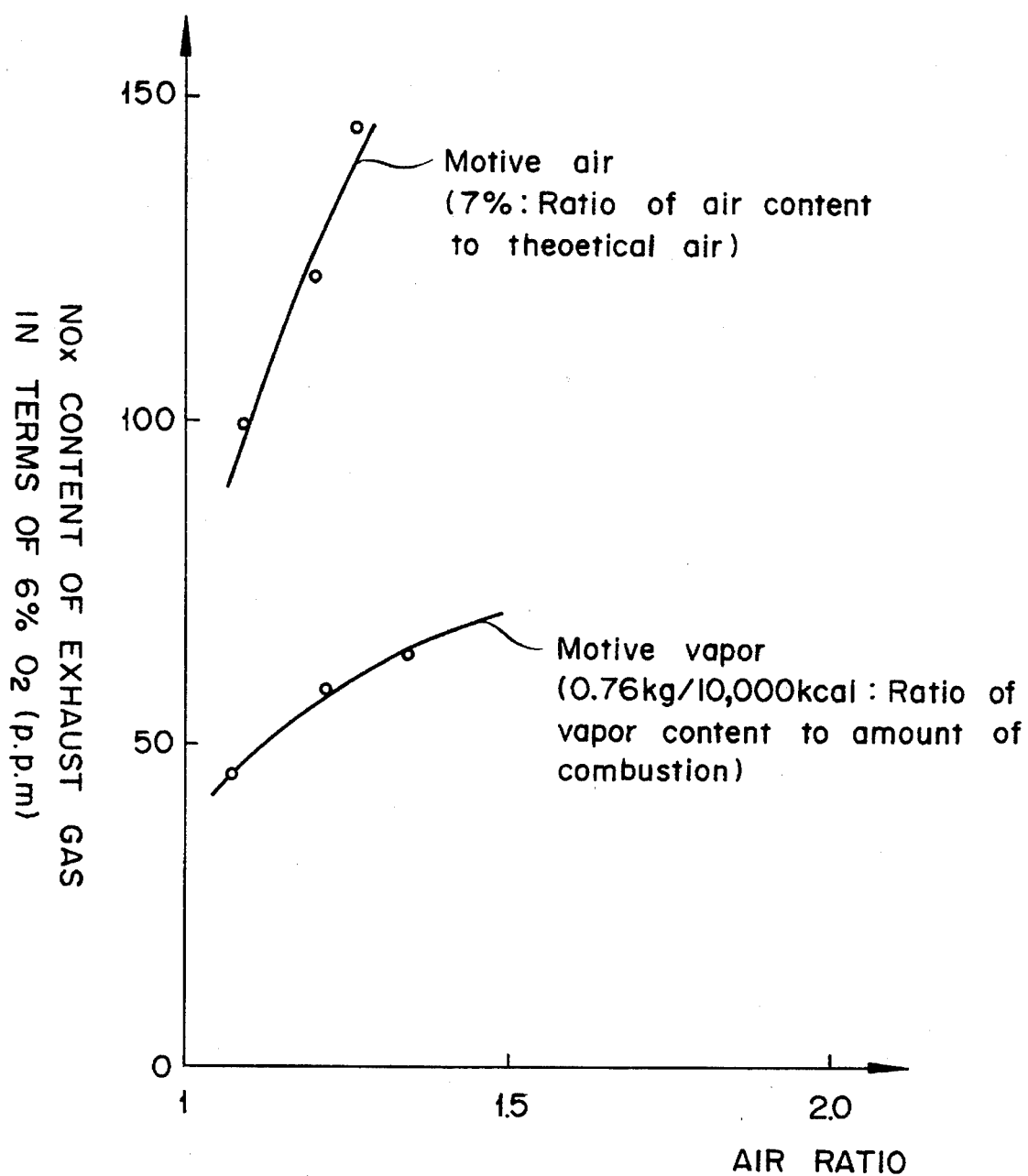
FIG. 6 is a graph showing the results of a test performed on the same combustion device for the $NO_x$ content of the exhaust gas discharged from the device.

The experiment was carried out by operating the combustion device of the present embodiment with LPG as the fuel therefor and meanwhile measuring the temperature of the exhaust gas the remained oxygen percent of the exhaust gas and the combustion chamber and the temperature of the combustion chamber relative to the rotational speed of the duct part 33. In the diagram of FIG. 5, the horizontal axis is the scale of the rotational speed of the duct part 33 and the vertical axis the scale of temperature.

It is clearly noted from the results of this experiment that the temperature of the exhaust gas sharply rises when the rotational speed of the duct part 33 is not more than 1 r.p.m. and that the temperature of the exhaust gas decreases at a lowered rate when the rotational speed exceeds 1 r.p.m.

The thermal efficiency under discussion can be calculated from the relation between the amounts of heat input and heat loss from the exhaust gas as indicated by the following formula.

$$\eta = (Q - C_p \cdot G \cdot T) \cdot 100/Q$$

wherein $\eta$ stands for the thermal efficiency, Q for the thermal capacity of the LPG gas, $C_p$ for the specific heat of the exhaust gas, G for the amount of the exhaust gas, and T for the temperature of the exhaust gas.

The thermal efficiency is determined by substituting the results obtained by the experiment described above for the relevant variables in the formula. In the case of a test run in which the rotation is made at such a relatively high speed as 2 r.p.m., for example, the temperature of the exhaust gas proper therefor is 250° C. The thermal efficiency in this case, therefore, is found to assume the following magnitude.

$\eta = (2500 - 0.32 \cdot 26 \cdot 250) \times 100/25000 = 91.68$ (%) Thus, the combustion device is found to manifest an excellent thermal efficiency exceeding 90%.

The excellent thermal efficiency thus manifested during the rotation made at such a relatively high speed as mentioned above may be logically explained by a postulate that since the increase in the rotational speed of the duct part 33 enables the thermal accumulator 32 to be heated by the exhaust gas without being appreciably cooled with the oxidizing agent discharged from the duct part 33, the temperature of the aspirated oxidizing agent is allowed to be still higher and the thermal efficiency to be proportionately exalted.

The oxidizing agent inlet part 42 mentioned above is the outcome of combination of a basal pipe 54 with a branched pipe 55 in the shape of the letter T. The basal pipe 54 is closed at one end thereof with a lid member 56 and is connected at the other end thereof to the supporting plate 50 disposed on the end part of the small-diameter part 33b of the duct part 33. In FIG. 3, the reference numeral "57" stands for a current plate.

A fuel pipe 58 for supplying the fuel to the burner 31 is disposed along the axis of the duct part 33. By providing in the fuel pipe 58 a pipe 59 adapted to supply motive air to the burner 31 and adjusting the amount of the motive air discharged through this pipe 59, the flame to be spouted from the burner 31 can be adjusted such as in size or sharpness.

The proper amount of the motive air is in the range between 2 and 15% to the stoichiometric combustion air.

Figure 7:
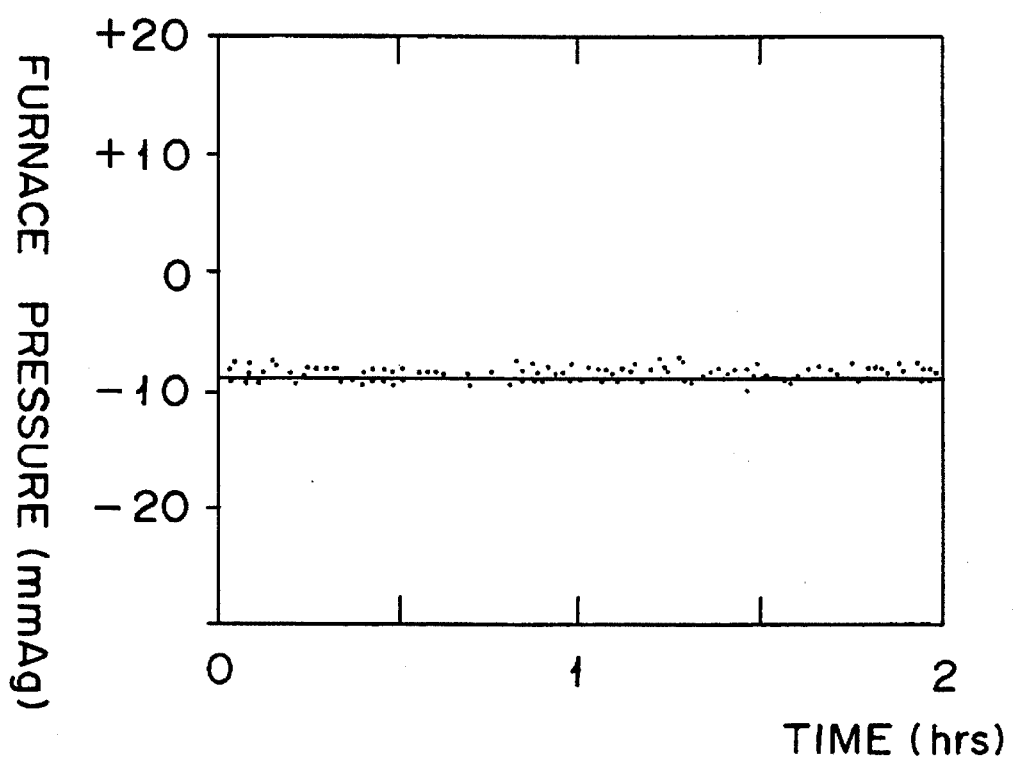
FIG. 7 is a graph showing the results of a test performed on the same combustion device for pressure fluctuation in the combustion chamber.
Figure 8:
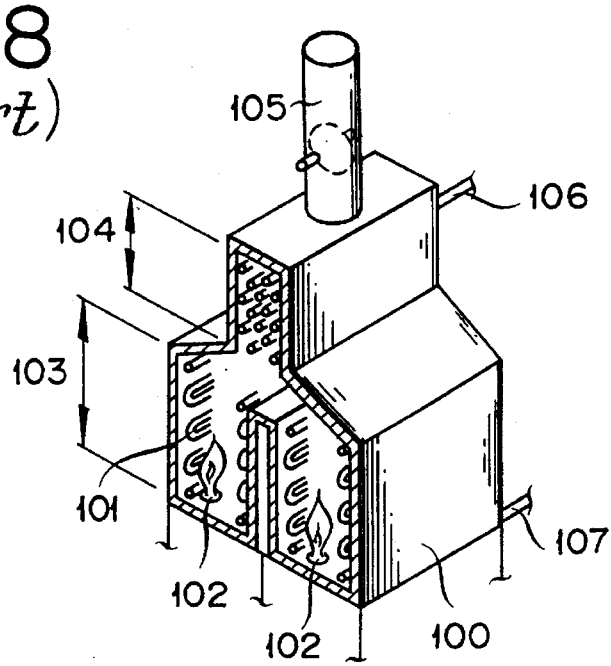
FIG. 8 is a perspective view illustrating a conventional pipestill heater with the end face thereof broken off.
Figure 9:
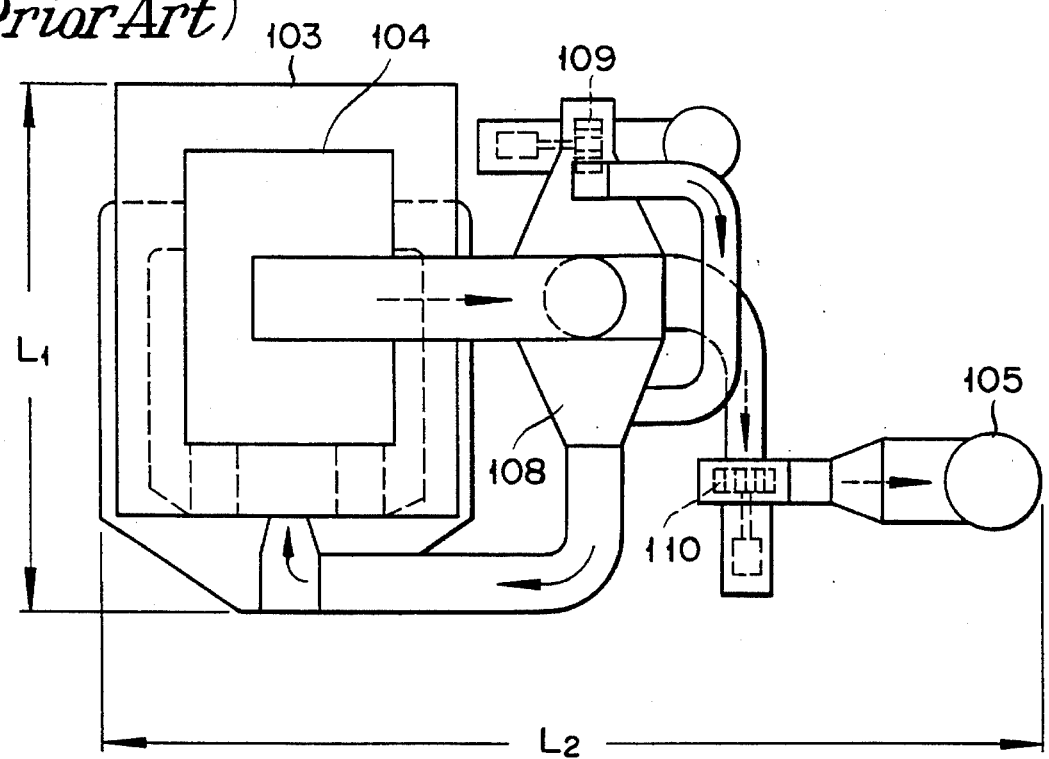
FIG. 9 is a plan view illustrating another conventional pipestill heater.

Optionally, steam may be spouted out of the pipe 59 in the place of the motive air. In this case, the $NO_x$ content of the exhaust gas is lowered while the flame is spouted as stably as when the motive air is spouted. The proper amount of the motive steam is in the range between 0.1 and 0.8 kg to 10,000 kcal of the fuel heating value. In an experiment performed to determine the pressure fluctration of the combustion chamber corresponding the elapsed time of this invention provided with one burner and consequently destined to assume the condition most susceptible of pressure fluctuation, the fluctuation was found to be slight as illustrated in FIG. 7.

Now, the operation of the present embodiment will be described below.

First, the exhaust gas damper 16 is actuated and, with the path 15 at the top of the furnace kept in a closed state, the forced draft fan 17 and the induced draft fan 19 are started, and the burner 31 is ignited with the motor M (FIG. 3) kept in rotation. As a result, the stream of the fuel passed through the fuel pipe 58 and spouted out of the burner 31 forms a flame as it obtains supply of oxygen from the oxidizing agent for combustion which has flowed through the oxidizing agent paths 36 and the thermal accumulator 32. This flame is spouted into the empty space S partitioned by the heating tubes P and the radiant heat of this flame is used in heating the fluid flowing through the medium of the heating tubes P to be heated therein.

The pipestill heater 10 of the present embodiment to be used for a catalytic reforming plant is so configurated as to omit a convection section and solely possess a radiation section. The radiant heat of the flame, therefore, is mostly absorbed and the thermal accumulation part in the radiation section.

Since the heat flux of this radiation section is generally larger than that of the aforementioned convection section, the overall length of the heating tube P may be smaller than that of the heating tube used in the conventional furnace possessing a convection section. As a result, the allowable pressure drop in the coil is decreased proportionately to the decrease in the overall length.

Even when the inlet temperature of the process fluid is required to be high and the allowable pressure drop in the coil to be small by process requirments as in the case of the pipestill heater for use in a catalytic reforming plant, the pipestill heater is capable of effecting the required heating without being restricted by the inlet temperature of the process fluid or the allowable pressure drop in the coil because the inlet temperature of the fluid can be elevated by the heating with the radiation section and the allowable pressure drop in the coil can be decreased as described above.

The hot exhaust gas which has played the role of heating the heating tube P in the combustion chamber H is discharged out of the combustion chamber H. This exhaust gas is passed through the thermal accumulator 32 and discharged through the exhaust gas discharge path 37. The thermal accumulator 32 is heated to be at an elevated temperature owing to the flow there through of the exhaust gas. When the oxidizing agent for combustion discharged through the rotating oxidizing agent supply path 36 is introduced into the thermal accumulator 32, therefore, this oxidizing agent for combustion is heated by the thermal accumulator 32. Since this heating is instantaneous in nature in the sense that the oxidizing agent for combustion is heated directly with the oxidizing which is spouted from the oxidizing agent path 36 toward the thermal accumulator 32, the greater part of the heat of the exhaust gas is utilized for heating the oxidizing agent for combustion. Thus, the oxidizing agent for combustion having acquired an elevated temperature is produced at a high efficiency without a heat loss and the temperature of the exhaust gas is fixed without reference to the elapse of time. The exhaust gas is at a low temperature when it is released out of the system.

Further, since the combustion and the discharge of the exhaust gas are continuously carried out, the pressure fluctuation of the combustion chamber due to the combustion is so small as to be disregarded.

The exhaust gas which results from the combustion in the combustion chamber H is discharged out of the furnace as described above. In this case, since the exhaust gas is aspired into the thermal accumulator 32 from around the flame, the exhaust gas mingles with the flame and gives rise to the so-called internal recycling effect of exhaust gas. As a result, the $NO_x$ content of the exhaust gas to be discharged is sharply decreased and the possibility of the exhaust gas polluting the environment is proportionately lowered.

The combustion device 30 is the outcome of combination of an oxidizing agent preheater with a burner. Owing to this construction of the combustion device 30, the pipestill heater, therefore, contributes immensely to the improvement of the thermal efficiency even from the structural point of view without heat loss caused by joining duct, and obviates the necessity for additional provision of such components as an oxidizing agent preheater and a waste-heat boiler. Thus, the furnace assumes a small total volume and occupies no large floor space. This apparatus of combustion for a pipestill heater is compact and inexpensive to construct.

The quantitative evaluation of the pipestill heater of this embodiment vs. the conventional furnace produced the results which are shown in Table 1 below.

The particulars of the pipestill heater which was used in this evaluation were as follows.

Design heat duty: $30 \times 10^6$ Kcal/H

Inlet/outlet temperatures of process fluid: 260°/400° C.

Fuel: Fuel gas

Thermal efficiency: 90%

Material of heating tube: Low-alloy steel

Allowable average heat flux: 27,100 Kcal/m² H

The conventional pipestill heater was provided with a convection section for preheating the fluid in addition to a radiation section. Moreover, it required additional provision of an oxidizing agent-preheating system because the convection section alone was incapable of attaining a thermal efficiency of 90% by reason of the limit of the inlet temperature of the process fluid.

TABLE 1

|  | Pipestill heater of this invention | Conventional pipestill heater |
|---|---|---|
| (Specification of heater) | | |
| Type of heater | Vertical pipestill box-type | Vertical pipestill box-type |
| Total heating surface area, m² | 1,110 | 5,350 |
| Radiation section | (1,110) | (800) |
| Convection section | (0) | (4,550) Inclusive of finned tubes |
| Specification of heating tubes In radiation section | | |
| Outside diameter, mm, of heating tubes | 165.2 | 165.2 |
| Length of heating tubes, m | 15 | 16 |
| Number of heating tubes | 144 | 96 |
| In convection section | | |
| Outside diameter, mm, of heating tubes | — | 165.2 |
| Length of heating tubes, m | — | 6 |
| Number of heating tubes | — | 152 |
| Pressure drop in tube | 100 (standard) | 115 |
| Specification of burner | | |

TABLE 1-continued

|  | Pipestill heater of this invention | Conventional pipestill heater |
|---|---|---|
| Number of burners | 18 | 16 |
| Amount of combustion per burner, MMKcal/H | 1.85 | 2.08 |
| Plan view of heater | | |
| Floor area required for heater, inclusive of fan and similar | 100 (standard) (Inclusive of fan) | 200 Inclusive of oxidizing agent preheating system |
| (Approximate cost of construction) | 100 (standard) Safety system proper for the pipestill heater of this invention included. | 120 |
| Remark | Operation of heater obtained in spite of burner element trouble | Operation of heater stopped in case of trouble in oxidizing agent preheater system |

The pipestill heater of the present embodiment has a slightly larger main body as illustrated in the bracket titled "Plan view of the pipestill heater" of the table. The reason for the larger main body just mentioned is that since the average heat flux or the film temperature of process fluid has an upper limit for the sake of enabling the fluid to avoid coking and since the pipestill heater of this embodiment imposes the same limit on the average heat flux or film temperature as the conventional pipestill heater, the heating surface area in the radiation section is increased and the floor space for the furnace proper is enlarged proportionately.

The pipestill heater of the present embodiment has the oxidizing agent preheater formed integrally with the combustion device. When it is compared with the conventional pipestill heater complete with an oxidizing agent system, it is found that the floor area required for the conventional pipestill heater is 200, based on the floor area of the pipestill heater of this invention taken as 100. This saving on the floor space proves conspicuously effective in providing exclusively the radiation section with the heating tubes by reason of the limit on the allowable pressure drop as encountered by the pipestill heater for use in a catalytic reforming plant. As clearly manifested in the approximate cost of construction, the reduction of the heating surface area results in a decrease of the total amount of expensive heating tubes and also of the expense of construction as compared with the conventional pipestill heater.

This invention needs not be limited to the embodiment described above but may be worked as suitably altered within the scope of this invention. A method of rotating not the thermal accumulator but the portion on the oxidizing agent supply path or the duct is applied in the embodiment cited above. This invention needs not be limited to the method but may use a way of rotating the thermal accumulator on condition that the thermal accumulator and the duct part relatively rotate. Further, the rotary duct part 33 has been depicted as being provided along the axis thereof with the pipe 59 for supply of motive air or motive steam. The provision of this pipe 59 is not critical.

Figure 2:
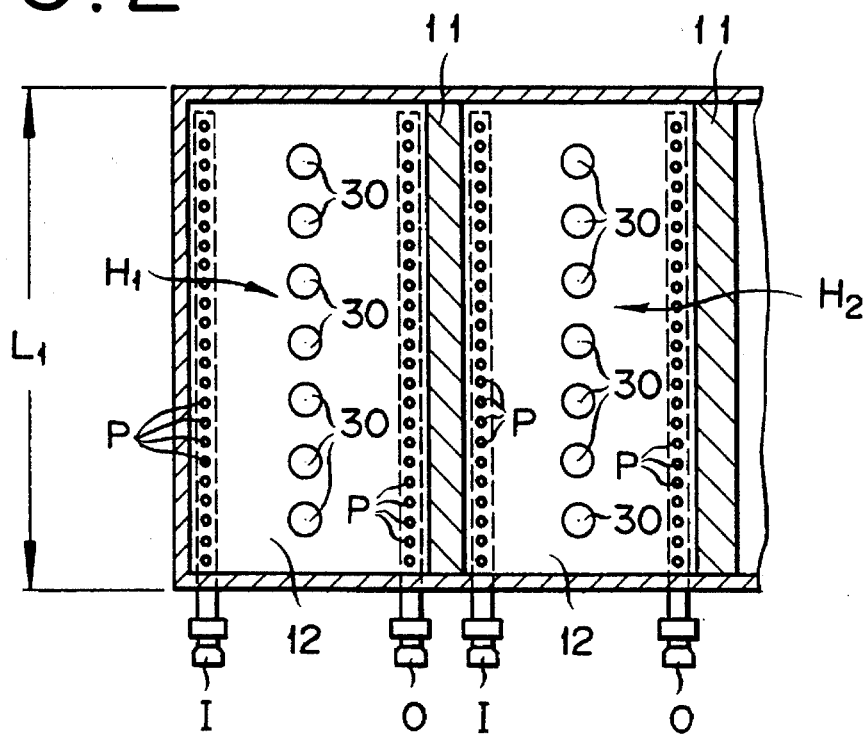
FIG. 2 is a cross section taken through FIG. 1 along the line 2—2.

Furthermore, the combustion devices which are disposed so as to be exposed to the combustion chambers may be installed only in one row as illustrated in FIG. 2 or in a plurality of rows as shown in the bracket titled "Plan view of the pipestill heater" of the table.

We claim:

1. In an apparatus of combustion for a pipestill heater composed of a combustion chamber, heating tubes adapted to allow flow therein of the process fluid and mounted inside said combustion chamber, and combustion devices disposed so as to spout flames into said combustion chamber and consequently to apply heat to the fluid flowing in said heating tube through said heating tubes, the improvement being in that said combustion devices are each composed of a burner for heating said heating tubes, an oxidizing agent supply path for supplying an oxidizing agent to said burner, an exhaust gas discharge path for discharging the exhaust gas resulting from the combustion to the exterior of said combustion chamber along a path separate from the flow of the oxidizing agent, an air-pervious heat accumulator attached to a wall of said combustion chamber, said oxidizing agent being discharged through said oxidizing agent supply path to pass through parts of said heat accumulator and, at the same time, said exhaust gas leading through said heat accumulator to said exhaust gas discharge path, the area of said heat accumulator for passing said oxidizing agent discharged from said oxidizing agent supply path through the heat accumulator being displaced relatively to said heat accumulator, said oxidizing agent supply path and said heat accumulator being adapted to be rotated relative to the exhaust gas discharge path, said oxidizing agent supply path including a duct, said exhaust gas discharge path being concentrically around a portion of said duct, a drive mechanism mounted to said duct, and a motor actuating said drive mechanism to rotate said duct.

2. An apparatus according to claim 1, wherein said oxidizing agent supply path is adapted to spout said oxidizing agent through an outlet part and over in the direction of said heat accumulator.

3. An apparatus according to claim 1, wherein said oxidizing agent supply path is formed inside a body case communicating with said heat accumulator and separated from said exhaust gas discharge path.

4. An apparatus according to claim 3, wherein said body case is divided by one and over of said oxidizing agent supply paths disposed therein and the intervals between the adjacent oxidizing agent supply paths constitute themselves said exhaust gas discharge paths.

5. An apparatus according to claim 4, wherein said oxidizing agent supply paths are disposed as regularly spaced circumferentially round said burner piercing the interior of said body case to establish alternation between said oxidizing agent supply paths and said exhaust gas discharge paths.

6. An apparatus according to claim 1, wherein said oxidizing agent supply paths have said outlet parts thereof blocked with an end plate provided with a multiplicity of small through holes.

7. An apparatus according to claim 1, wherein said burner is furnished with an air pipe for supplying motive air.

8. An apparatus according to claim 1, wherein said burner is furnished with a pipe for supplying motive steam.

9. An apparatus according to claim 1, wherein said heat accumulator is made of a ceramic substance.

* * * * *